July 26, 1960 W. LINDENBERG 2,946,991
MATERIAL LEVEL INDICATING APPARATUS
Filed Nov. 14, 1955

INVENTOR
WALDEMAR LINDENBERG
BY
ATTORNEYS

United States Patent Office 2,946,991
Patented July 26, 1960

2,946,991
MATERIAL LEVEL INDICATING APPARATUS

Waldemar Lindenberg, Hamburg-Hausbruch, Germany, assignor to Fuller Company, Catasauqua, Pa., a corporation of Delaware Filed Nov. 14, 1955, Ser. No. 546,690

4 Claims. (Cl. 340—244)

This invention relates to apparatus for remote indication of the quantity of a material stored in a bin, silo or similar container, and has especial application with respect to the storage of granular solid materials having some electrical conductivity or dielectric losses, or a dielectric constant other than unity or a combination of these properties. Apparatus according to the invention may be arranged to provide indication of the level of the material as being above or below a specified height in the container, or to provide indication of a continuously varying level of material.

The invention will now be described in detail with reference to the accompanying drawings in which.

Figure 1:
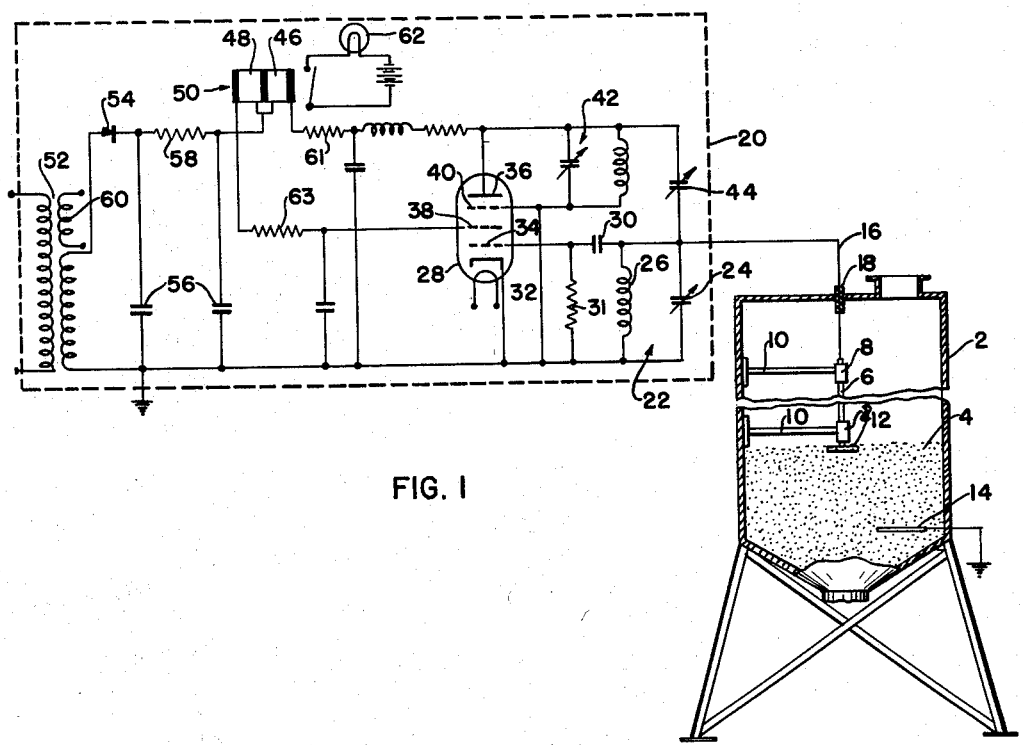
Fig. 1 is a diagrammatic representation of one embodiment of the invention.

In Fig. 1 a storage bin, silo or the like indicated at 2 is shown containing a quantity of material 4 having some electrical conductivity, preferably low but not equal to zero. A metallic probe 6 is supported within the bin, for example in insulating sleeves 8 supported on struts 10 attached to the bin walls, so that the probe extends downwardly into the bin to position its lower extremity at a desired level therein. This level may of course be adjusted by motion of the probe in its supports. A plate 12 may be affixed to the lower end of the probe to insure good contact of the probe with the material 4 when the surface of the latter rises to the level specified by the location of plate 12.

In case the walls of the container 2 are made of non-conducting material, a further plate 14 or other conducting element may be provided in the bin below the level of the probe end or plate 12 to insure for the body of material 4 the same potential as that existing at a reference point in the circuit of the remote indicating portion of the apparatus, presently to be described. To this end it is convenient to ground the plate 14, or the bin walls if conducting.

A conductor 16, passing out of container 2 through an insulator 18, connects the probe 6 electrically with the level-measuring and -indicating portion of the apparatus, schematically shown in Fig. 1 within the dash line box 20. The components shown within the box 20 may be located remotely from the container 2 in any convenient place. Within box 20 conductor 16 connects to the ungrounded side of an oscillatory circuit generally indicated at 22. The circuit 22 includes a condenser 24 and an inductance 26. Elements 24 and 26 form a parallel resonant circuit whose ungrounded end is coupled to the control grid of a vacuum tube 28 through a coupling condenser 30. As shown tube 28 is of the pentode type and includes not only a cathode 32, control grid 34 and anode 36 but also a screen grid 38 and suppressor grid 40.

A second oscillatory circuit generally indicated at 42 is connected between anode 36 and ground and coacts with circuit 22 to form with tube 28 an electron tube oscillator. Feedback from anode to control grid of the tube is provided at a condenser 44, preferably of adjustable type as shown, and the tube is provided with grid leak bias by operation of the condenser 30 and a grid leak resistor 31.

The anode 36 and screen grid 38 are connected to a common source of D.C. voltage. In the embodiment of Fig. 1 these connections are made via the separate windings 46 and 48 of a differential relay generally indicated at 50. The junction of these windings 40 and 42 itself connects to the source of plate voltage for the tube. For purposes of illustration this is shown in Fig. 1 as comprising a transformer 52, a rectifier 54, and a filtering circuit comprising condensers 56 and a series resistor 58. The transformer 52 may be employed to step up as required the voltage from a household lighting circuit, for example, and may include a step down secondary winding 60 for the supply of heater voltage to the filament of tube 28.

In a preferred embodiment of the invention as illustrated in Fig. 1, which provides simply an indication whether the level of the material in bin 2 is above or below the end of the probe 6, the oscillator comprising tube 28 and its associated grid and plate circuits 22 and 42 is adjusted for steady electrical oscillations with the material 4 below the end of the probe. Under these conditions the oscillatory circuit 22 comprises condenser 24, coil 26 and a minute and generally negligible capacity between the probe 6 and the walls of the container 2 or the electrode 14. The relay 50 is so adjusted, for example by selection of the number of turns in its windings 46 and 48, that under the condition of oscillations obtaining with the material 4 out of contact with the probe, the armature of the relay is not attracted and the relay remains deenergized.

When the level of material in the bin, here assumed to have a low but perceptible electrical conductivity, rises sufficiently to contact the probe 6, the resistance through the material 4 from the probe to ground (via plate 14) is connected in parallel with circuit elements 24 and 26. This resistance loads circuit 22, and the amplitude of oscillations in circuits 22 and 42 consequently declines.

The characteristics of the tube 28 are such that upon this decline in amplitude of oscillations the screen grid and the anode currents change unequally. Typically both currents will increase, but the plate current will increase more than the screen grid current, resulting in energization of the relay. For dependability of operation the oscillator as a whole is preferably so adjusted, for example by means of the variable feedback condenser 44, that contact of the probe 6 with the material 4 causes the tube to fall out of oscillation altogether. Proper adjustment of the dropping resistors 61 and 63 in the plate and screen grid circuits may be made to assist in achieving this result.

The cessation of oscillations is accompanied by such a change in the relative magnitude of the plate and screen grid currents of tube 28 as to insure operation of relay 50.

The relay may be employed to actuate any desired form of indicating device. In Fig. 1 it is shown as controlling a lamp 62.

Figure 2:
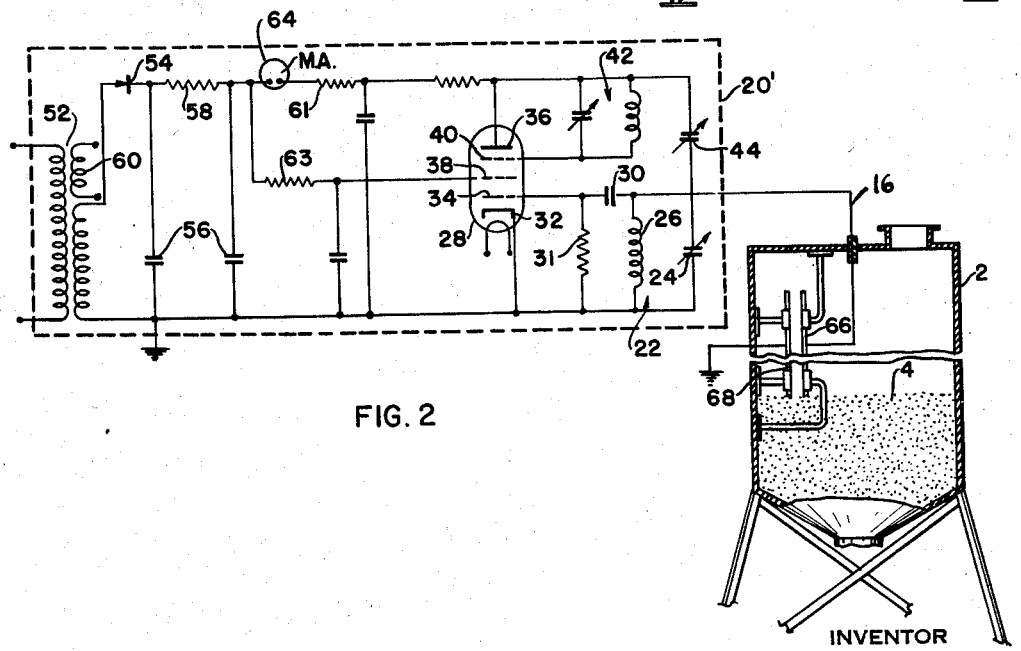
Fig. 2 is a diagrammatic representation of a second embodiment of the invention.

Fig. 2 shows another embodiment of the invention, capable of indicating not only the presence of the surface of the material at or above a single level but of reporting the height of this surface at any level between two limits which may be separated by a substantial interval. In this embodiment the bin 2 may be the same as in Fig. 1, and the remote measuring and indicating apparatus shown within the dash line box 20' may be the same as that of the box 20 in Fig. 1 except that a current meter 64 in series with the anode of tube 28 replaces the differential relay 50.

In place however of the probe 6 there is supported within the bin a condenser comprising parallel conducting plates 66 and 68, insulated from each other. The plate 68 is connected to ground, and the plate 66 connects with conductor 16 and hence with the junction between circuit 22 and the feedback condenser 44. Plates 66 and 68 are advantageously constructed to extend over a substantial portion of the height dimension of the bin. For example they may extend throughout the range of depths in the bin over which the level of material 4 is expected to fluctuate.

With the level of the material 4 below the lower limit of plates 66 and 68 the oscillatory condition of the oscillator in the box 20' is determined by the values of the circuit constants within box 20' and by the capacity of condenser 66, 68 with air as the dielectric between its plates. However when the material 4 rises in the container 2 to contact plates 66 and 68, the constants of the oscillatory system are changed, in a manner dependent on the fraction of the space between plates 66 and 68 filled with the material and hence, in the embodiment of Fig. 2, on the height of the material. The change in constants may be made up of several ingredients. If the material 4 has electrical conductivity, this conductivity will represent a leakage resistance in the condenser comprising plates 66 and 68. With respect to such leakage resistance the embodiment of Fig. 2 operates in a manner similar to that of Fig. 1, giving an indication when the level of material 4 reaches the height necessary to contact plates 66 and 68. In addition however even without any leakage resistance, i.e. with infinite resistivity for the material 4, the material may be characterized by dielectric losses which will absorb energy from the alternating voltage applied to plates 66 and 68 as long as oscillations continue. These dielectric losses will load the resonant circuit 22 in a manner dependent on the fraction of the interelectrode space of condenser 66, 68 which the material occupies. These losses will reduce the amplitude of oscillations in a manner similar to that explained with reference to Fig. 1 except that the fall in amplitude will be a gradual one with increase in height for the surface of the material 4. This reduction in amplitude of oscillations will result in changing plate and screen grid currents in tube 28. A current meter such as the meter 64 inserted in series with either of these tube electrodes will therefore give a measure of the height of the surface of material 4.

If the material has a dielectric constant other than unity, the capacity of condenser 66, 68 will be increased by a factor dependent on the value of this dielectric constant and on the fraction of the interelectrode spacing occupied by the material. The increase in capacity, which is in parallel with condenser 24, will further detune the resonant frequency of circuit 22 from the frequency of oscillations, which is determined basically by circuits 22 and 42 together, and this detuning will also contribute to a change in the amplitude of oscillations which will be reflected in a change in the currents drawn by the plate and screen grid electrodes of the tube. Thus the meter 64 can be calibrated in the units of material height, for different materials.

Thus in both embodiments an admittance is provided in the path between the electrode connected to conductor 16 and the grounded electrode in the container, whether it be the walls of the container, a lower level plate 14 or an electrode shaped to form a condenser with the electrode connected to conductor 16. This admittance is in parallel with the elements 24 and 26 of circuit 22. The value of the admittance changes with the level of the material 4 and the result is a change in the condition of oscillations which can be interpreted as a change in the height of the material.

The apparatus of the invention can be adapted to a wide variety of materials and operating conditions, for example by adjustment of the feedback coupling condenser 44. As the capacity of this condenser is increased, the amplitude of oscillations increases, within limits. This amplitude may be adjusted to the properties of the material in the container in order to produce a change from oscillatory to non-oscillatory condition when the material reaches the probe (in the example of Fig. 1). Alternatively in the embodiment of Fig. 2, the initial amplitude of oscillations, i.e. with an empty bin, may be adjusted to produce a suitably graduated change in plate or screen grid current of the oscillator tube upon change in the material level over the limits of height which it is desired to indicate. Likewise the basic frequency of oscillations of the circuit, uninfluenced by the presence of material in the storage container, can be adjusted over wide limits to suit the properties of the material to be measured, so that any change in the constants if the oscillatory circuit 22 with its external elements within the storage container will result in a change in the oscillatory condition at the indicator 20 or 20' which can be perceived as a change in the level of material 4.

While the invention has been described herein in terms of preferred embodiments, the invention is not limited to the details of the apparatus so illustrated and described. For example, it is not necessary for an operative embodiment according to Fig. 2 that the plates 66 and 68 of the condenser provided within the storage space extend vertically. They may be otherwise disposed consistently with the achievement of a variation in condenser capacity and/or dielectric losses with material height. The scope of the invention is rather set forth in the appended claims.

I claim:

1. Apparatus for indicating the height in a storage space of the surface of a body of material having a low electrical conductivity different from zero, said apparatus comprising an electrode disposed within said space in position to be contacted by said material upon a rise in the height of the surface of said material to the location of said electrode, an electron discharge tube including a cathode, an anode, and control and screen grids, a first oscillatory circuit coupled between said anode and a point of fixed potential, a second oscillatory circuit coupled between said control grid and a point of fixed potential, a condenser of adjustable capacity coupling said oscillatory circuits together to form therewith and with said tube an electron tube oscillator, means to couple in parallel with the second of said circuits the resistance between said electrode and a location in said storage space below said electrode, and a differential relay having one coil in series with the anode and one coil in series with the screen grid of said tube.

2. Apparatus for indicating the height of the surface of a body of material in a storage container, said apparatus comprising an electrode supported within said container, conducting means exposed to the interior of said container, a tuned-plate tuned-grid oscillator circuit including a screen grid type electron discharge tube, means connecting the resistance between said electrode and conducting means in shunt with one of the tuned circuits of said oscillator circuit, and a differential relay having one coil in series with the anode and one coil in series with the screen grid of said tube.

3. Apparatus for indicating the height in a storage space of the surface of a body of material, said apparatus comprising two electrodes disposed within said space in position to be contacted by said material upon a rise in the height of the surface of said material to the location of said electrodes, an electron discharge tube including a cathode, an anode, and control and screen grids, a first oscillatory circuit coupled between said anode and a point of fixed potential, a second oscillatory circuit coupled between said control grid and a point of fixed potential, a condenser of adjustable capacity coupling said oscillatory circuits together to form therewith and with said tube an electron tube oscillator, means to couple in parallel with the second of said circuits the admittance between said electrodes, and a differential relay having one coil in series with the anode and one coil in series with the screen grid of said tube.

4. Apparatus for indicating the height of the surface of a body of material in a storage container, said apparatus comprising two electrodes supported within said container, a tuned-plate tuned-grid oscillator circuit including a screen grid type electron discharge tube, means connecting the admittance between said electrodes in shunt with one of the tuned circuits of said oscillator circuit, and a differential relay having one coil in series with the anode and one coil in series with the screen grid of said tube.

References Cited in the file of this patent

UNITED STATES PATENTS

| | | |
|---|---|---|
| 2,354,964 | Ostermann et al. | Aug. 1, 1944 |
| 2,375,084 | Coroniti et al. | May 1, 1945 |
| 2,477,511 | Comb | July 26, 1949 |
| 2,506,143 | Edelman | May 2, 1950 |
| 2,657,579 | Milsom | Nov. 3, 1953 |
| 2,677,964 | Engelder | May 11, 1954 |
| 2,774,959 | Edelman | Dec. 18, 1956 |